United States Patent
Taniguchi et al.

(10) Patent No.: US 6,456,048 B2
(45) Date of Patent: Sep. 24, 2002

(54) VEHICLE ALTERNATOR WITH ANTI-HUNTING FEATURE AND VEHICLE ALTERNATOR CONTROL SYSTEM

(75) Inventors: Makoto Taniguchi, Kariya (JP); Tomoya Okuno, Nishio (JP); Koji Tanaka, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/893,417

(22) Filed: Jun. 29, 2001

(30) Foreign Application Priority Data

Jun. 29, 2000 (JP) ........................... 2000-195905

(51) Int. Cl.$^7$ ............................ H02P 7/06; H02P 9/10; H02P 9/00; H02P 9/14; H02P 11/00
(52) U.S. Cl. ............................ 322/28; 322/25; 322/29; 322/59; 322/89
(58) Field of Search ............................ 322/28, 25, 29, 322/59, 89

(56) References Cited

U.S. PATENT DOCUMENTS

| | | | | |
|---|---|---|---|---|
| 3,942,393 A | * | 3/1976 | Forster et al. | 192/103 C |
| 4,178,546 A | * | 12/1979 | Hulls et al. | 322/99 |
| 4,210,857 A | * | 7/1980 | Korbell | 322/28 |
| 4,625,160 A | * | 11/1986 | Hucker | 310/115 |
| 5,321,231 A | * | 6/1994 | Schmalzriedt et al. | 219/202 |
| 5,448,154 A | * | 9/1995 | Kanke et al. | 322/22 |
| 5,483,146 A | * | 1/1996 | Schultz et al. | 322/29 |
| 5,485,405 A | * | 1/1996 | Wilson | 701/220 |
| 5,767,636 A | * | 6/1998 | Kanazawa et al. | 318/139 |
| 6,121,757 A | * | 9/2000 | Takahashi et al. | 322/27 |
| 6,169,407 B1 | * | 1/2001 | Wang et al. | 324/664 |
| 6,184,661 B1 | * | 2/2001 | Becker et al. | 322/25 |

FOREIGN PATENT DOCUMENTS

| | | |
|---|---|---|
| DE | 4440830 | 5/1996 |
| EP | 408055 | 1/1991 |
| EP | 510527 | 10/1992 |
| EP | 545616 | 6/1993 |
| EP | 865143 | 9/1998 |
| JP | A-54-7111 | 1/1979 |
| JP | 363204159 A | * 8/1988 |
| JP | B2-6-55040 | 7/1994 |
| JP | A-6-343300 | 12/1994 |
| JP | A-7-123796 | 5/1995 |
| JP | A-7-194021 | 7/1995 |
| JP | A-2000-50523 | 2/2000 |
| WO | WO 9842069 | 9/1998 |

\* cited by examiner

*Primary Examiner*—Nestor Ramirez
*Assistant Examiner*—Julio R. Gonzalez
(74) *Attorney, Agent, or Firm*—Oliff & Berridge, PLC (57) ABSTRACT

Shift means shifts a rotation speed range to a low rotation speed side based on an electricity amount related to rotation speed. In the rotation speed range, driving torque of a generator is suddenly changes as a result of an increase of duty ratio of a switch due to a shortage of generation capacity caused by a reduction of a rotation speed of a vehicle alternator. Preferably, the shift means shifts the rotation speed range to the low rotation speed side by changing the adjust voltage based on the electricity amount related to rotation speed while the rotation speed is reduced.

20 Claims, 7 Drawing Sheets

ENGINE ROTATION SPEED

FIG. 9 PRIOR ART

VEHICLE ALTERNATOR WITH ANTI-HUNTING FEATURE AND VEHICLE ALTERNATOR CONTROL SYSTEM

CROSS REFERENCE TO RELATED APPLICATION

This application is based on and incorporates herein by reference Japanese Patent Application No. 2000-195905 filed on Jun. 29, 2000.

BACKGROUND OF THE INVENTION

1. Field of the Invention

The present invention relates to an alternator suitable for use in a vehicle.

2. Description of Related Art

A rotation speed during an idling state (hereinafter, referred to as idling engine speed) of a vehicle has a tendency to be set low in order to protect terrestrial environment such by decreasing exhausting gas and reducing an amount of fuel consumption. For example, there is such a vehicle that the idling engine speed thereof is set to around 550 rpm.

In a low friction engine like this, when the idling engine speed is reduced, a slight disturbance causes a flutter of an engine rotation speed. That is, a hunting phenomenon occurs because the engine is extraordinarily sensitive to the reduction of the rotation speed.

A mechanism of the hunting phenomenon will be explained in more detail.

Figure 8:
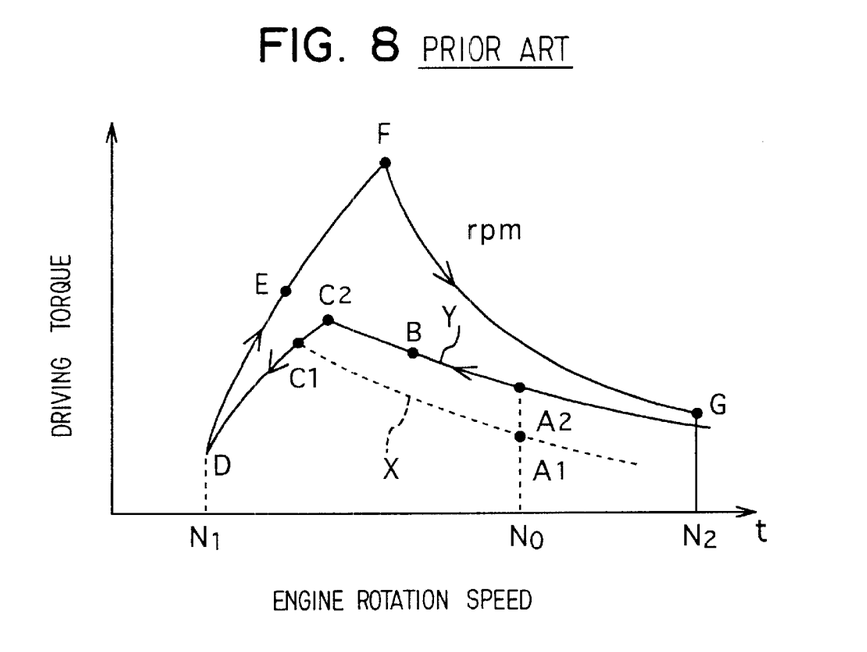
FIG. 8 is a graph showing a relationship between rotation speed and driving torque in a conventional control unit (prior art)

FIG. 8 shows a relationship between rotation speed of a generator and torque required for driving thereof (hereinafter, referred to as driving torque). A curved line A1–C1 indicates a driving torque characteristic while a constant generation load is applied. A curved line A2–C2 indicates a driving torque characteristic while a constant generation load slightly larger than the constant generation load described above is applied. Points C1 and C2 indicate lower limit of the rotation speed and the driving torque for allowing the alternator to generate an output more than a required load. Consumption torque (load torque) of the alternator is suddenly changed at the points C1 and C2, and becomes the disturbance cannot be negligible for an engine. When the alternator is moved to lower rotation side than the points C1 and C2, since a current supply to a vehicle load cannot be satisfied by only output power of the alternator, a vehicle battery compensates the electric power.

For example, in a current supply state of a continuous service load (electric load required at least in term of vehicle operation such as ignition, drive of fuel injection valve, and driving power of control computer thereof) an engine becomes a stabilized state at point A1 in a range of the idling engine speed. At this time, when additional electric load, for example, a small light or the like is applied, an output of the alternator is increased by increasing in an exciting current. As a result, the driving torque of the alternator is increased, and an operational point moves from the point A1 to point A2. At this time, an engine only injects fuel to become the stabilized state in the point A1, a feedback control of fuel injection for an engine is remarkably delayed. Therefore, the rotation speed of the engine is reduced, and the operational point moves to point B after all. As the rotation speed is reduced, the driving torque for driving the alternator is increased, so that the operational point furthermore continues the lowering below the point B.

At this time, a feedback control system of fuel injection immediately detects the lowering of the rotation speed, and increases the amount of fuel injection for the purpose of maintaining the operational point to the point A2. However, since it takes a certain time from the fuel injection through an explosion thereof and conversion thereof into torque, thereby introducing remarkable control delay after all as described above.

Due to this control delay, the operational point drops to point D, discharge from the battery is caused. In a short while, the feedback control of the fuel injection for the engine starts to operate and the rotation speed transfers from the lowering to an uprising, while the alternator charges the battery in order to compensate a discharged capacity of the battery occurred at the previous time. At this time, the alternator has to output a total current of a current required by the electric load of the vehicle and charging current of the battery, and the operational point moves on a curved line D-E-F via point E by increasing the driving torque in an acceleration manner.

Figure 9:
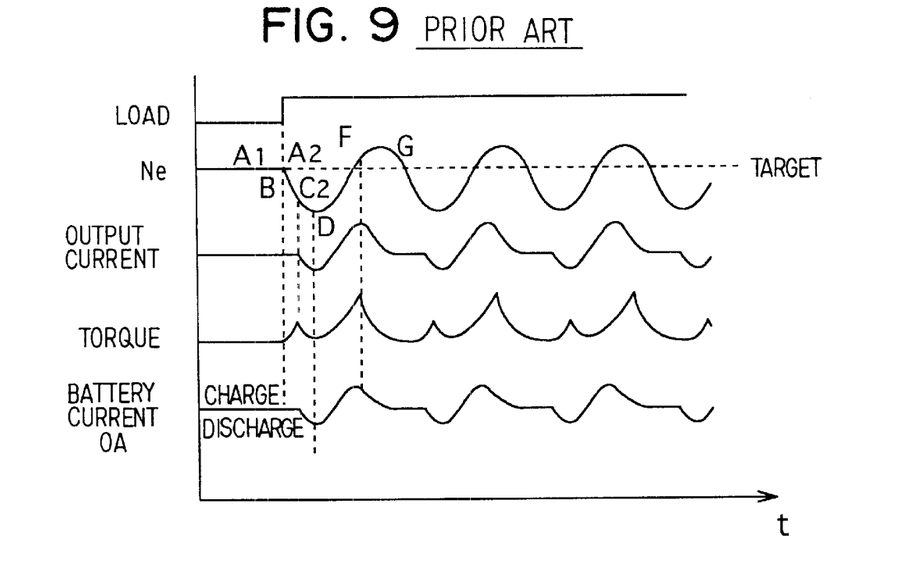
FIG. 9 is a timing chart showing operations of respective sections in the conventional control unit (prior art).

After a while, when the operational point reaches point F and a charge to the battery is finished, since output current of the alternator is reduced to a required electric load of the vehicle. Thus, the driving torque is also abruptly reduced and the operational point moves on a curved line F-G. At this time, the engine increases fuel for the purpose of increasing the rotation speed reduced to the point D. However, when the operational point exceeds the point F, the load torque of the engine is abruptly decreased. Thus, the rotation speed of the engine is increased in an acceleration manner, and the operational point is moved upwardly to point G. Thus, the feedback control system of the fuel injection detects the uprising of the rotation of the engine, and tries to control for the purpose of maintaining the operational point to the point A2 by reducing the amount of fuel injection. However, due to fluctuation of the driving torque and the control delay of the alternator, the engine rotation speed is fluctuated in a range of N1 through N2, and repeats hunting. FIG. 9 shows a timing chart showing the hunting phenomenon.

The hunting of the rotation speed of the alternator is improved by restraining the discharge of the battery by mounting a large output alternator. However, an adoption of the large output alternator is not easy viewing from a mounting space, cost, and a noise.

For inhibiting the hunting, JP-A-54-7111 discloses a method of adjusting the driving torque by controlling an output voltage corresponding to a speed differential of the alternator. JP-B2-6-55040 discloses a method for increasing an adjusting voltage while maintaining a delay of predetermined time with respect to the uprising of the rotation speed of an engine. JP-A-7-123796 discloses a method for detecting an application of the electric load, lowering the adjust voltage for a moment, and thereafter, the adjust voltage is gradually returned to the original state thereof.

However, in JP-A-54-7111, the control is started after the rotation speed starts to rise due to delay in the detection of a first drop of the rotation speed, so that a convergence of the hunting takes a lot of time, or it is resulted in an engine stop at the worst situation when the drop of the rotation speed is large. Further, according to the present method, an exciting current (or duty ratio) is controlled in order to properly control the output voltage of the alternator to a predetermined voltage. However, since the output voltage of the alternator connected to the battery depends on a state of the battery not on the exciting current, the control of the output voltage is not easy. For example, the output voltage of the alternator on a curved line A2–C2 charges the battery by generating power more than the open terminal voltage of the battery. However, when the rotation speed is reduced and the operational point is reduced under the point C2, the battery starts to discharge, and the terminal voltage of the battery continues to decrease in order to cancel out polarization obtained by the charge. At this time, the adjust voltage of the alternator is set at a constant value, so that the alternator itself cannot control the output voltage. Therefore, the output voltage depends on the terminal voltage of the battery. When the operational point resides on a curved line D-F, the dependence on the battery is the same.

In the method of the JP-B2-6-55040, the adjust voltage is changed in a considerably wide range from the idling engine speed to the maximum rotation speed. Viewed from paying attention to only the idling state, the battery voltage hardly changes. Therefore, the charge and discharge of the battery causing the hunting cannot be prevented. If the change of the adjust voltage is made large in the vicinity of the idling engine speed, the battery voltage in the maximum rotation speed becomes higher than necessary voltage, and the high voltage of the battery not only promotes a reduction in battery electrolyte and a decrease of battery life span, but also results in a deviation from a voltage range for appropriate operation of each device in the electric system.

According to the method of JP-A-7-123796, the application of electric load is detected, and the adjust voltage is reduced for a moment and is gradually returned to the original state. In this method, there arises the following disadvantage.

That is, in this method, in order to detect the application of the electric load only during engine idle without the delay, any signals to inform the application of the electric load from the vehicle must be received, and it becomes difficult to take a countermeasure within the alternator. An electrical system for a vehicle becomes complicated and expensive as in JP-A-6-343300.

SUMMARY OF THE INVENTION

An object of the present invention is to provide a vehicle alternator reducing and smoothening the fluctuation of driving torque thereof, so that the hunting of the rotation speed is suppressed during an engine idle.

According to the present invention, an AC generation section has a rotor including a plurality of field poles and driven by a vehicle engine, a field coil for magnetizing the field poles, an armature including an armature coil and arranged facing the field poles. A rectifying means rectifies AC voltage generated by the armature coil to DC voltage and charges an electricity accumulating means. A rotation speed detecting means detects an electricity amount related to rotation speed of the rotor. A voltage control unit includes a comparing section for comparing an electricity amount related to the DC voltage with a predetermined adjust voltage and a switch connected in series to the field coil. The voltage control unit converges the DC voltage to the adjust voltage by intermittently controlling the switch based on a compared result of the comparing section. The voltage control unit includes a shift means for shifting a rotation speed region to a low rotation speed side based on the electricity amount related to rotation speed. Within the rotation speed region, driving torque of the alternator suddenly changes as a result of an increase of duty ratio of said switch due to a shortage of generation capacity caused by a reduction of the rotation speed.

Thereby, a inflection point of a fluctuation of the engine rotation speed is forcibly moved, within an engine idling range, to rotation speed further lower than a lower limit to which an engine rotation speed drops, so that engine load torque is smoothly changed. Here, the engine rotation speed drop is caused by an increase of the driving torque (load torque viewed from engine) of the vehicle alternator particularly when an electric load is applied.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1:
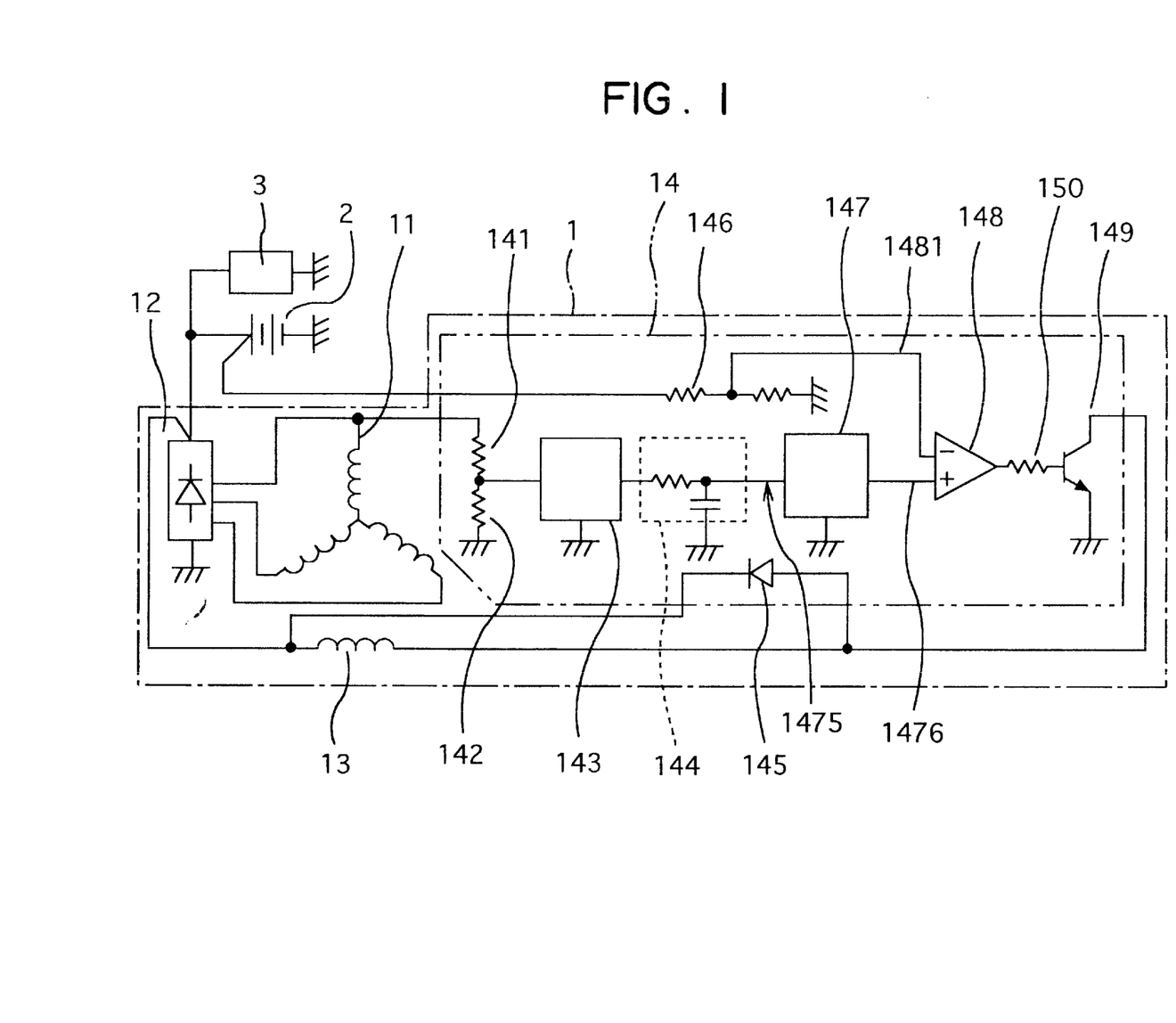
FIG. 1 is a schematic view showing a block diagram of a control unit of the present invention.

FIG. 1 is a block diagram showing a voltage control unit of a vehicle alternator 1.

The vehicle alternator 1 is driven by a pulley mounted on a crankshaft of the engine through a belt, and the alternator 1 is mounted around the engine. Electric power generated by the alternator 1 is stored in a battery 2. Electric current is supplied from battery 2 and the alternator 1 into an electric load device 3 through a switch (not illustrated) when a load is applied.

The alternator 1 includes an armature coil 11. Here, although the most general symmetric 3-phases coil is illustrated as an example, the number of phases is optional. A diode type full wave rectifier 12 converts the AC power generated by the armature coil 11 into DC power. A field coil 13 is wound around a rotor core (not illustrated) including a plurality of field poles. A voltage control unit 14 controls a DC output voltage generated by the alternator 1 to a predetermined voltage by adjusting a field current flowing in the field coil 13.

Resistor elements 141, 142 form a resistance dividing voltage circuit for dividing an AC voltage (generated voltage) of one phase output terminal of the armature coil 11. A frequency detecting device 143 detects a fundamental wave frequency of the divided AC voltage described above. Here, a F/V converter is adopted as the frequency detecting device 143. A low-pass filter 144 extracts a DC voltage composed of low-range components of output voltage of the frequency detecting device 143. Here, a CR low-pass filter is used. An adjust voltage generating device 147 converts the DC voltage described above to an adjust voltage command value output from the low-pass filter 144. Resistor elements 146 form a second resistance dividing voltage circuit for dividing a voltage of the battery 2. A comparator 148 compares the divided voltage of the battery voltage with the adjust voltage command value output from the adjust voltage generating device 147. A power transistor 149 works as a switch in the present invention and is driven by an output voltage of the comparator 148. The power transistor 149 is connected in series to the field coil 13. The power transistor 149 may be formed as a high side switch configuration. A circulating diode 145 circulates a field current when the power transistor 149 is turned off. Numeral 150 denotes a base current limit resistor.

Figure 2:
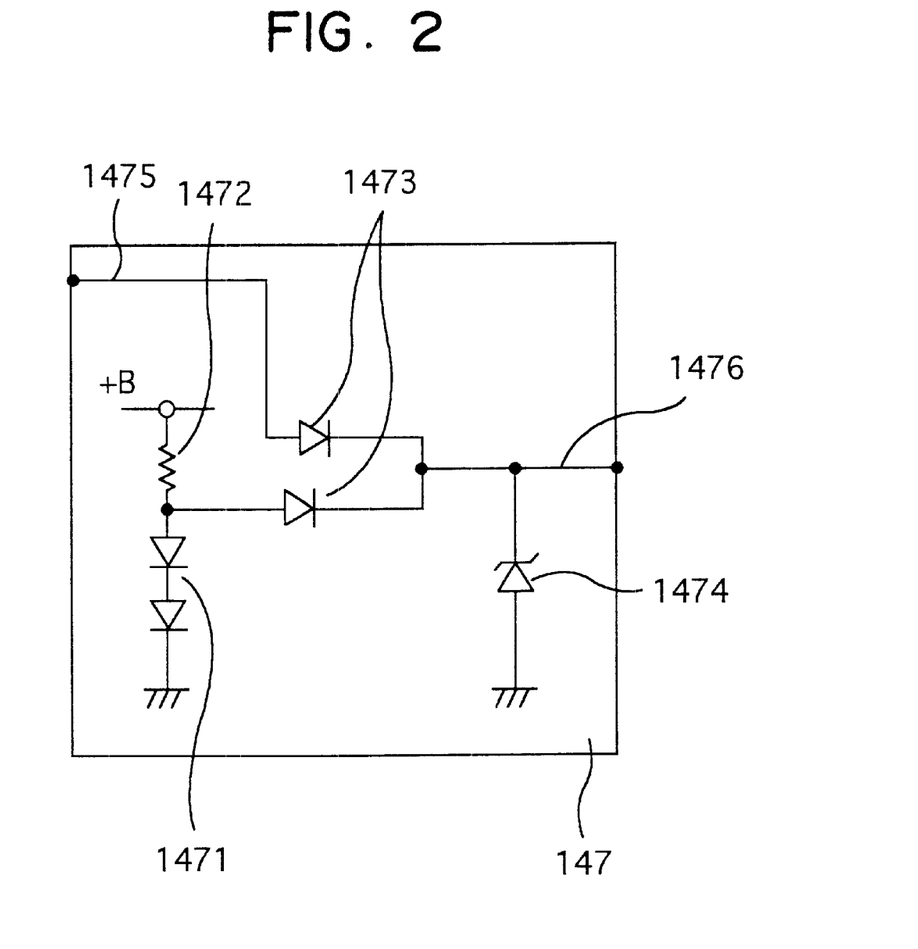
FIG. 2 is a schematic view showing a circuit diagram of an adjust voltage generating device.

Details of the adjust voltage generating circuit 147 will be explained hereinafter with reference to FIG. 2.

An output voltage 1475 of the low-pass filter 144 is a DC voltage proportioned to rotation speed of a rotor.

A plurality of diodes 1471 are connected in series, and output a lower limit of the adjust voltage command value by forming a constant voltage circuit together with a resistor element 1472. An anode of the highest potential of the diode group 1471 is connected to a battery potential (B potential) through the resistor element 1472, and a cathode of the lowest potential is grounded. Since the diode group 1471 is formed of two steps connection, the lower limit of the adjust voltage command value becomes approximate 1.2 V. The lower limit of 1.2 V of the adjust voltage command value corresponds to a larger value than a no-load open terminal voltage of the battery 2, for example 12.8 V. Here, the number of steps of the diode 1471 is not limited to two.

A diode-or circuit 1473 outputs a voltage by selecting a larger one between the output voltage of the low-pass filter 144 and the lower limit of the adjust voltage command value 1.2 V. The diode-or circuit 1473 outputs the adjust voltage lower limit 1.2 V when the rotation speed of the rotor is low and the output voltage of the frequency detecting device 143 is less than the lower limit 1.2 V of the adjust voltage command value. The diode-or circuits 1473 outputs the output voltage of the frequency detecting device 143 when the rotation speed of the rotor is high and the output voltage of the frequency detecting device 143 is more than the lower limit 1.2 V of the adjust voltage command value.

A Zener diode 1474 determines an upper limit of the adjust voltage command value, and a breakdown voltage thereof is set to the upper limit of the adjust voltage command value corresponding to the adjust voltage 14.5 V, for example, 1.36 V.

The adjust voltage command value determined as described above is applied to a positive input terminal of the comparator 148 through a signal line 1476. A negative input terminal of the comparator 148 is connected with the second resistance dividing voltage circuit via a signal line 1481.

Figure 3:
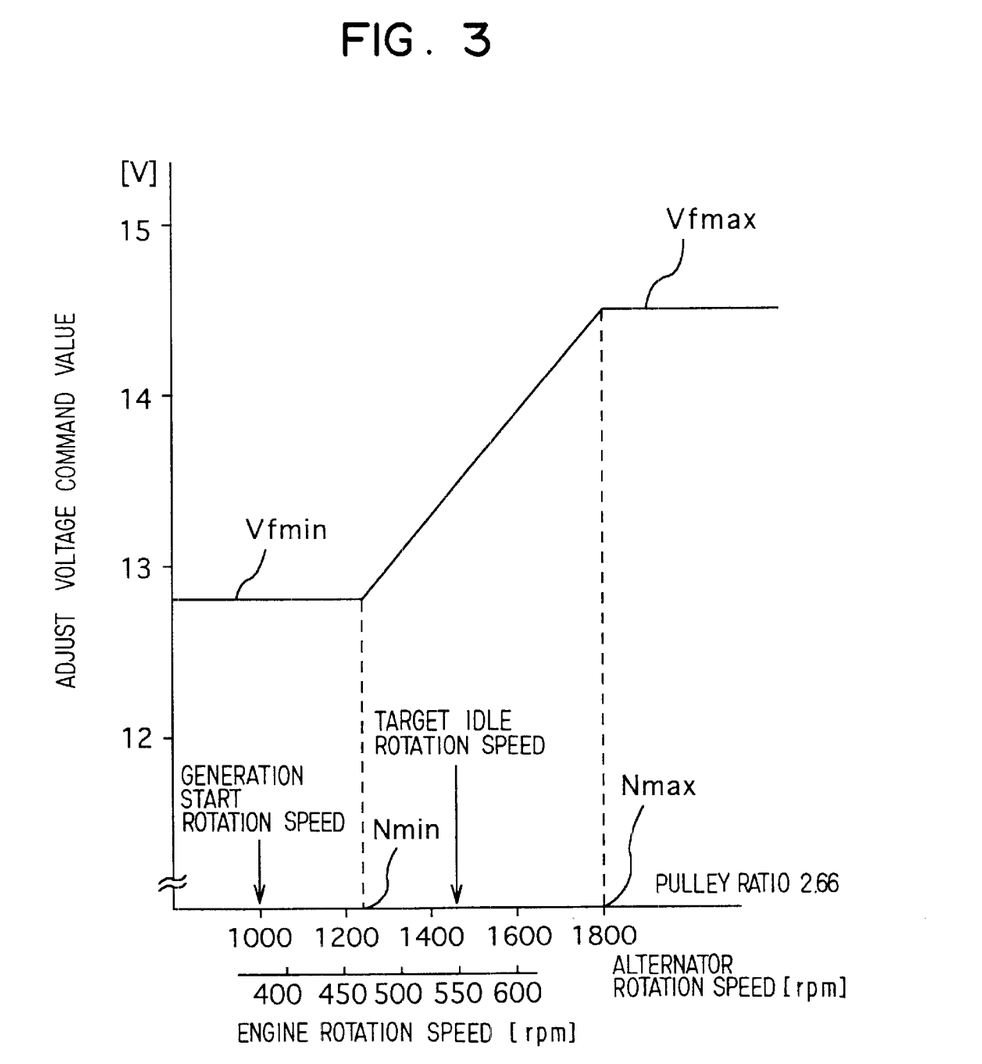
FIG. 3 is a graph showing a relationship between adjust voltage and rotation speed in the control unit.

FIG. 3 shows a relationship between the adjust voltage value output by the adjust voltage generating device 147 and the rotation speed of the alternator 1.

In the present embodiment, as shown in FIG. 3, a rotation speed Nmin corresponding to a lower limit Vfmin (corresponding to adjust voltage command value 1.2 V) of the adjust voltage is set to a value higher than a generation start rotation speed (here, 1000 rpm) of the alternator 1, for example the rotation speed of the generator at around 1200 rpm. A rotation speed Nmax corresponding to an upper limit Vfmax (corresponding to adjust voltage command value 1.36V) of the adjust voltage is set at 1.5 through 2 times of the generation start rotation speed, for example, in the vicinity of 1800 rpm.

A control operation of this apparatus will be explained with reference to FIG. 4 being a timing chart. Ne denotes a rotation speed of the alternator 1, Vp denotes a wave form of a one-phase AC voltage, Vreg denotes an adjust voltage command value, and Vfv denotes an output voltage, which is referred to also as DC voltage, of the low-pass filer 144.

Since the rotor of the alternator 1 has 2 p ("p" denotes the number of magnetic pole pairs) pieces of magnetic poles, when the rotor rotates at N[rpm], the AC voltage having the fundamental wave frequency of N□p/60 [Hz ] is induced in the armature coil 11 during generation. For example, when the number of the magnetic poles is twelve, and the rotation speed of the rotor is 1500 rpm, a fundamental wave frequency component of the induced AC voltage is 150 Hz. When the number of the magnetic poles is sixteen, the number of the rotation speed of the rotor is 1800 rpm, the fundamental wave frequency component of the induced AC voltage is 240 Hz.

Since an output terminal of the armature coil 11 is connected to the battery 2 through the three phases full wave rectifier 12, upper and lower limits of the induced AC voltage are clamped at constant voltages. The waveform of the AC voltage is formed in a rectangular wave shape having approximately 50% of duty ratio. The upper limit thereof is, for example, 14.5 V substantially equal to a terminal voltage of the battery. The lower limit thereof is substantially 0 V.

Figure 4:
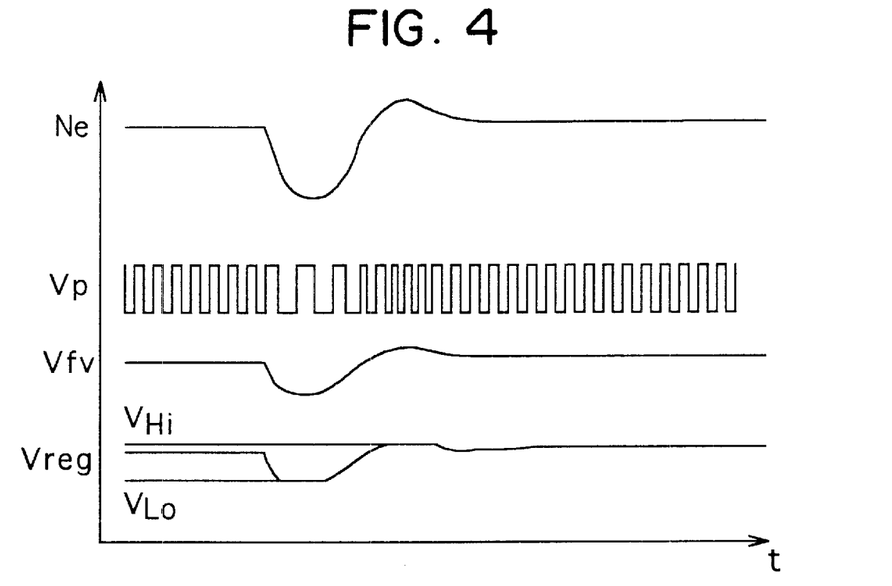
FIG. 4 is a timing chart showing states of respective sections in the control unit.

When the rotation speed changes, frequency of the waveform Vp of the AC voltage generated in the armature coil 11 changes according to the change of the rotation speed as shown in FIG. 4. Signal voltage Vfv is f/V converted by the frequency detecting device 143 and low-pass extracted by the low-pass filter 144. The adjust voltage generating device 147 converts the signal voltage Vfv into the adjust voltage command value Vreg. The adjust voltage command value Vreg is compared with the partial voltage of the battery voltage by the comparator 148, and the power transistor 149 is switching controlled.

In the present embodiment, when the engine speed is reduced by the current load, the adjust voltage command value Vreg is also reduced with the reduction of the rotation speed. Even when the duty ratio of the power transistor 149 is reduced by the reduction of the adjust voltage Vreg, the field current is not immediately reduced to 0, and the field current is continued to flow through the fly wheel diode 145 until magnetic energy accumulated in the field magnetic circuit is disappeared. A field magnetic flux is continued to generate, and the armature coil 11 continues to generate. Further, a recent high output alternator uses a field circuit up to a magnetic saturation level. Thus, after that, even when the field current is attenuated to a certain degree, an actual field flux still stays in an almost un-attenuated state. Thus, an electric power generation is highly effectively conducted. Here, the rotation speed is reduced and the adjust voltage is also reduced, so that the generated voltage is gradually reduced along the above-described attenuation of the magnetic energy accumulated in the field magnetic circuit. Thus, the battery 2 operates to cancel a charging polarization thereof. However, since the generated power is approximately maintained for the reason that the field circuit is used normally in a high magnetic saturation field as described above, the reduction of the generated voltage increases the generated current that the generator outputs, and the generated current satisfies an electric current amount required by the electric load device 3. As a result, electric discharge from the battery 2 to the electric load device 3 is excellently restrained, so that the battery 2 does not perform a considerable discharge.

When the adjust voltage is not reduced, the adjust voltage Vreg is maintained at a constant voltage when the electric load is applied and the engine rotation speed is reduced, regardless the reduction of rotation speed. Thus, reduction of the generation output due to reduction of the rotation speed, and reduction of the battery voltage due to reduction of the generated voltage increases the duty of the transistor 149. Thus, driving torque (load torque viewed from engine) of the alternator 1 is increased, and the engine rotation speed is further reduced. Further, the generator rotation speed is further reduced, and the rotation speed is reduced to a range in which the power generation capacity of the generator is deficient with respect to the required load amount, thereby introducing the considerable discharge of the battery 2.

Next, an increasing aspect of the rotation speed after increasing for a while engine torque by an engine fuel injection control system detecting the reduction of the engine rotation speed will be explained.

When a reduction control of the adjust voltage (follow-up of rotation speed) is executed, as described above, the discharge of the battery 2 remains in a slight amount, so that an additional generation by the generator is not necessitated to recover the charge of the battery 2. Accordingly, the engine does not have to perform a torque increase including a portion of an increase of the drive torque corresponding to the additional generation. Moreover, since the adjust voltage is increased in accordance with an increase of the rotation speed, the battery charge for the recovery of the charge polarization of the battery 2 and for restoring the battery voltage to an original state is gently performed following to an increase of the generation output corresponding to an increase of the rotation speed, so that an overshoot of the rotation speed is not generated.

Contrary to this, when the adjust voltage is not reduced, discharge of the battery 2 is considerable so far, and the duty of the transistor 147 is large. Thus, the load torque viewed from the engine becomes large, an increase of the engine torque delays, and, the increase of the engine torque after recovering the engine torque becomes remarkably large comparing with the adjust voltage control in the present embodiment. As a result, the rotation speed is recovered, the battery charge is completed, the battery voltage is recovered, and the driving torque of the alternator 1 is decreased. Then, an increase of the engine rotation speed, that is, the overshoot becomes large, and a hunting occurs due to a response delay of the feedback control system of fuel injection. In the prior art, even in a recovery aspect of the engine rotation speed, the adjust voltage is made as a constant. Thus, in a bottom of the engine rotation speed, that is, in an early stage of the recovery of the engine rotation speed, above-described problem leads to perform a large generation due to a large or small relationship between not reduced adjust voltage and reduced battery voltage. Therefore, the overshoot of the rotation speed after that (after completing battery charge), and the hunting after that become furthermore serious problems.

As a second advantage of a follow-up control of the rotation speed to the adjust voltage in the present embodiment, as described above, since a frequent charge and discharge of the battery 2 due to the intermission of the electric load can be suppressed, sufficient life span of the battery is attained.

Here, during an engine idling and battery charging, the battery voltage is not reduced below a no-load open voltage (for example, 12.8 V). That is, unless reducing the adjust voltage below 12.8 V, the battery is not brought into the considerable discharge state. Accordingly, by providing the adjust voltage command value (partial voltage of adjust voltage) with a lower limit, and setting the corresponding rotation speed thereof higher than the generation start rotation speed of the generator, a considerable discharge of the battery 2 is easily prevented from occurring.

Further, when the adjust voltage is continued to be raised with an increase of the rotation speed, the battery is excessively charged, and not only the life span of the battery is shortened due to rapid reduction of battery electrolyte, but also it is possible to reach an excessive voltage considered so as to cause damage appropriate operations of any vehicle equipment. In order to prevent such a phenomenon, in the present embodiment, the adjust voltage command value is provided with the upper limit, the rotation speed corresponding to the upper limit is set 1.5 through 2 times of the generation start rotation speed of the generator. That is, by executing the adjust voltage control of the present embodiment only in the vicinity of the idling engine speed, and by controlling the rotation speed at the upper limit of adjust voltage during normally running, the problem described above is solved.

Here, an operation delay of the low-pass filter 144 connected to the rear stage of the frequency detecting means 143, for example, in the CR low-pass filter, a CR time constant thereof should be set small, and preferably desirable to be set less than 0.1 seconds.

Figure 5:
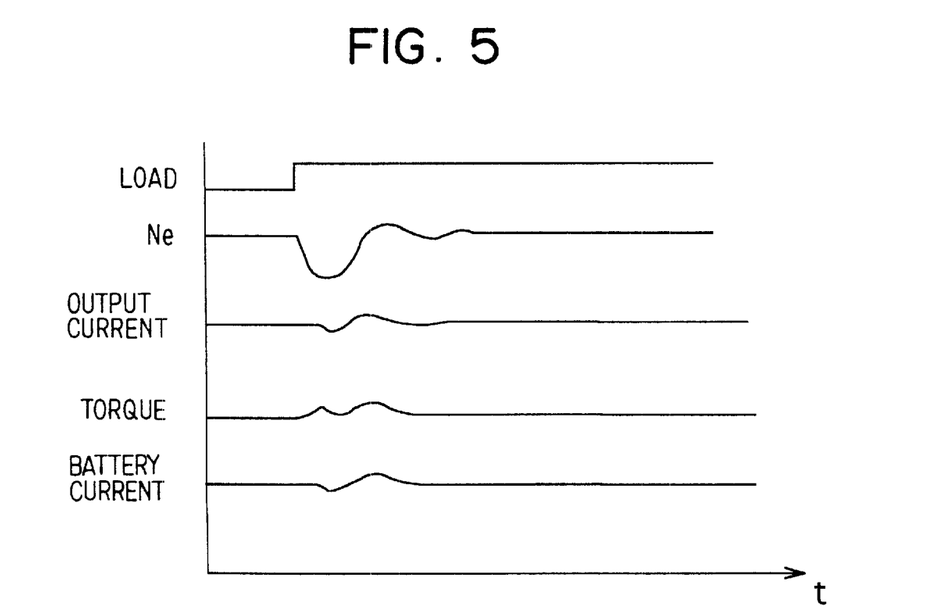
FIG. 5 is a timing chart showing an operational of the control unit.
Figure 6:
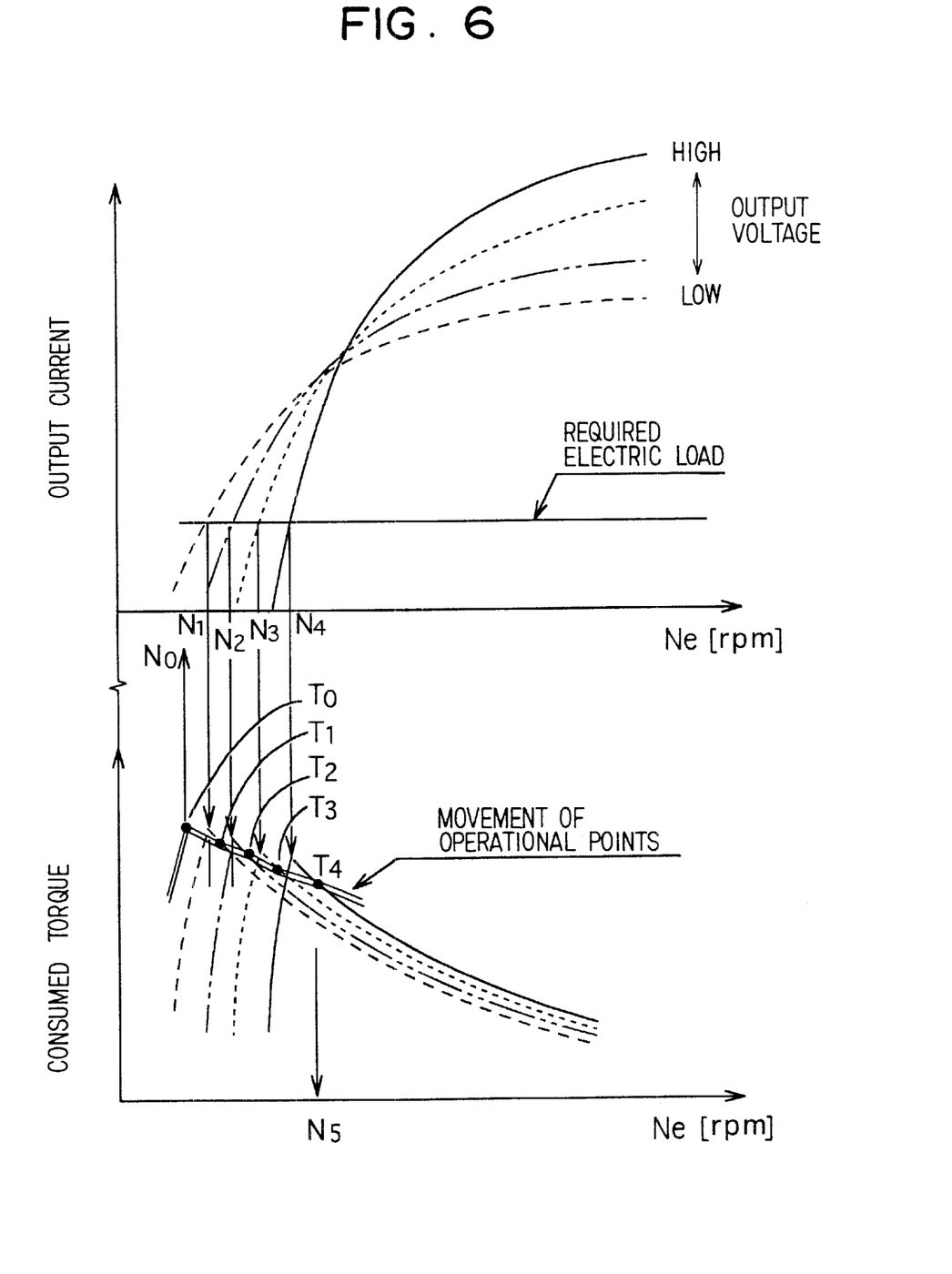
FIG. 6 is a graph showing a relationship among output current, driving torque and output voltage of a vehicle alternator.

A hunting restraining effect, in a case where the present embodiment is applied to the alternator commercially available is shown in FIG. 5, and a relationship between an output current and the driving torque in various output voltages of the normal alternator is shown in FIG. 6.

As in the present embodiment, even when the output voltage is changed within the range of 1–1.5 V, power to be generated by the alternator 1 is approximately constant. Strictly speaking, the higher the voltage, the larger becomes output power, however, within the range of 1–1.5 V and particularly within the range of low rotation speed, increase and decrease of the output power is negligible. That is, in a region of low rotation speed, since the output power being a product of the output voltage and the output current is approximately constant, the output current is increased when the output voltage is reduced.

Particularly in a small type high output alternator in recent years, an armature reaction is small in a low speed area. Thus, a main magnetic flux is not led to be demagnetized, the armature and the core of the field poles are operated in high saturated states thereof. Then, the field flux is considered approximately constant with a slight decrease of any amount of exciting current, and the output power thereof is not reduced.

In this case, since the output voltage is being reduced in accordance with the reduction of the rotation speed, the torque sudden change points are moved in order of N4, N3, N2, and N1.

For example, when the alternator is operated at a value of N5 of the rotation speed slightly higher than the value N4 of the rotation speed, and at the operational point T4, if the control of the present embodiment is applied, the output voltage is reduced following to the reduction of the rotation speed, and the operational points are moved in order of T4, T3, T2, T1, and T0.

That is, in the prior art, the inflection point of the torque is accepted at the rotation speed N4. However, in the present embodiment, that can be reduced to N0 of the rotation speed. That is, even when the electric load is applied and the engine rotation speed is suddenly reduced, the torque inflection point of the alternator 1 is positioned outside a drop range of the engine rotation speed.

Even when the engine rotation speed is reduced, the driving torque of the alternator does not exceed the torque inflection point (point at which driving torque of alternator viewed from engine side changes from decreasing tendency to increasing tendency). This means that the generation duty ratio of the alternator does not reach 100%, and that the generation capacity of the alternator is regarded as apparently improved. In the control of the present embodiment, a deviation between the battery voltage and the target voltage (adjusting voltage) thereof is invariably made small, so that even when the rotation speed is reduced, the discharge of the battery is suppressed. As a result, when the engine control system is entered in a recovering process of the rotation speed, necessity to charge the battery is reduced. Thus, the torque fluctuation of the alternator is reduced, and an idle hunting is converged in an early stage.

When the adjust voltage is continuously changed in accordance with a change of the rotation speed, the fluctuation of the operational torque described above is more smoothly performed. That is, the discharge of the battery 2 is inhibited even at a low speed side, and re-charge after that is suppressed.

(Modifications)

Figure 7:
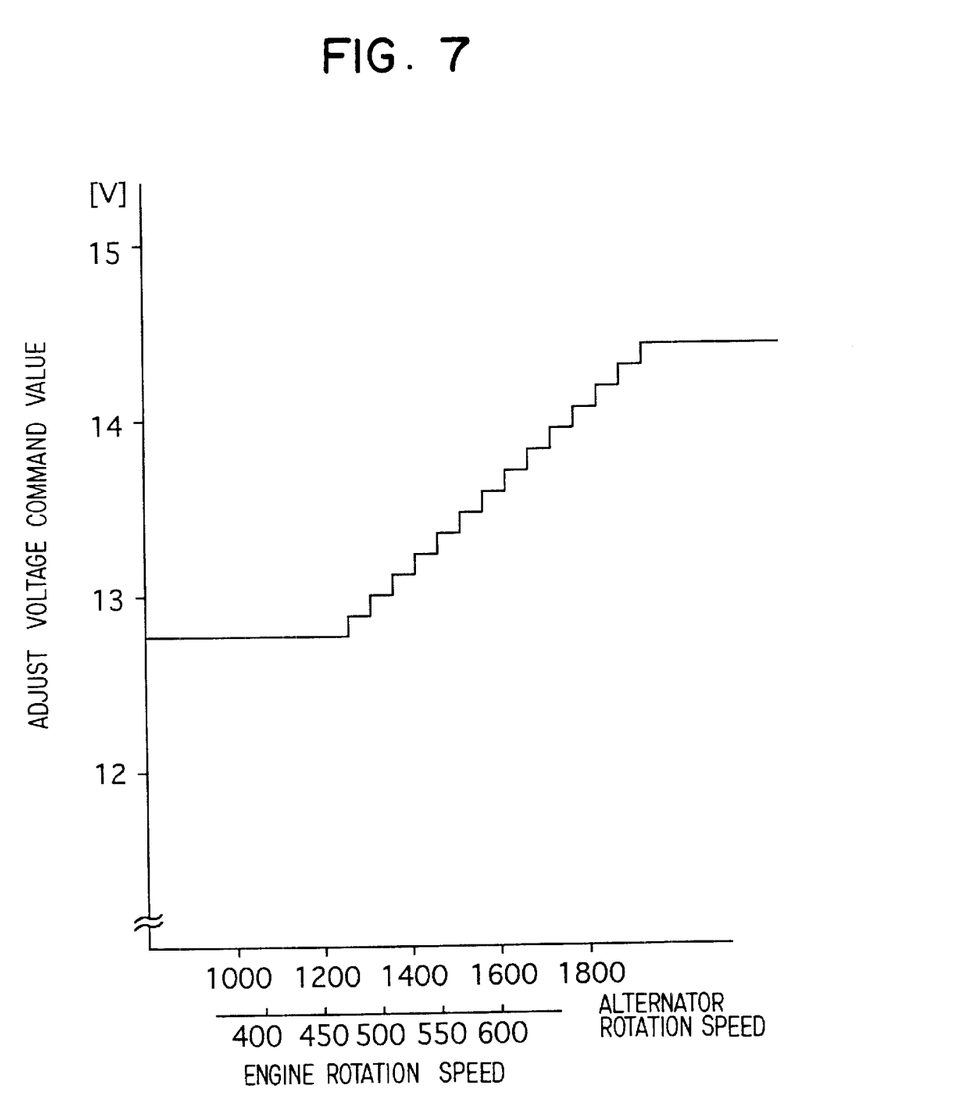
FIG. 7 is a graph showing a relationship between adjust voltage and rotation speed (modification)

A characteristic of an adjust voltage in the modification is shown in FIG. 7.

In the modification, a control of the adjust voltage is changed like a multi-stages stair from a lower limit to an upper limit within a predetermined frequency range. By changing like this, digital processing of detected rotation speed signals becomes easy.

Note, a terminology referred to as "DC voltage" used in the present specification includes a low-pass AC component.

What is claimed is:

1. An alternator for a vehicle, comprising:
   an AC generation section driven by a vehicle engine, and having a field coil and an armature coil;
   a rectifying means for rectifying AC voltage generated by said armature coil to DC voltage and charging an electricity accumulating means;
   a rotation speed detecting means for detecting an electricity amount related to rotation speed of said AC generation section; and
   a voltage control unit including a comparing section for comparing an electricity amount related to the DC voltage with a predetermined adjust voltage and a switch connected in series to said field coil, said voltage control unit converging the DC voltage to the adjust voltage by intermittently controlling said switch based on a compared result of said comparing section, wherein said voltage control unit includes a shift means for shifting a rotation speed of a driving torque inflection point of the alternator based on the electricity amount related to rotation speed so as to reduce the rotation speed of the driving torque inflection point in accordance with a reduction of the rotation speed, and in the driving torque inflection point, driving torque of the alternator suddenly changes as a result of an increase of duty ratio of said switch due to a shortage of generation capacity caused by a reduction of the rotation speed.

2. An alternator according to claim 1, wherein said shift means shifts the rotation speed of the torque inflection point by changing the adjust voltage based on the electricity amount related to rotation speed.

3. An alternator according to claim 2, wherein said shift means changes the adjust voltage in accordance with a change of the electricity amount related to rotation speed.

4. An alternator according to claim 2, wherein
   said shift means changes the adjust voltage in accordance with the electricity amount related to rotation speed within a predetermined range of the electricity amount related to rotation speed and within a predetermined range of the adjust voltage,
   said shift means sets an upper limit of the adjust voltage corresponding to an upper limit of the electricity amount related to rotation speed, and
   said shift means sets a lower limit of the adjust voltage corresponding to a lower limit of the electricity amount related to rotation speed.

5. An alternator according to claim 4, wherein said shift means continuously changes the adjust voltage in accordance with the electricity amount related to rotation speed within the predetermined range of the electricity amount related to rotation speed.

6. An alternator according to claim 5, wherein said shift means changes the adjust voltage in accordance with the electricity amount related to rotation speed within a predetermined control delay time.

7. An alternator according to claim 6, wherein the control delay time is set to 0.1 seconds or less.

8. An alternator according to claim 4, wherein said shift means changes the adjust voltage in a step-like manner in accordance with the electricity amount related to rotation speed within a predetermined range of the electricity amount related to rotation speed.

9. An alternator according to claim 4, wherein the rotation speed corresponding to the upper limit of the electricity amount related to rotation speed is set larger than a rotation speed corresponding to a vehicle engine idling speed.

10. An alternator according to claim 9, wherein the rotation speed corresponding to the upper limit of the electricity amount related to rotation speed is set to 1.5–2 times of a predetermined generation start rotation speed.

11. An alternator according to claim 4, wherein the rotation speed corresponding to the lower limit of the electricity amount related to rotation speed is set larger than a predetermined generation start rotation speed.

12. An alternator according to claim 4, wherein the lower limit of the adjust voltage is approximately equal to an open terminal voltage of said electricity accumulating means or larger than the open terminal voltage by a predetermined voltage.

13. An alternator according to claim 4, wherein the upper limit of the adjust voltage is set to continuous service voltage when the vehicle normally runs.

14. An alternator according to claim 2, wherein said rotation speed detecting means detects the electricity amount related to rotation speed based on a fundamental wave frequency of a one-phase output voltage of said armature coil.

15. An alternator according to claim 14, further including a low-pass filter for extracting a low-pass component of an output voltage of said rotation speed detecting means.

16. An alternator according to claim 1, wherein said rotation speed detecting means converts frequency information included in an output voltage of said armature coil into voltage signal.

17. A vehicle alternator control system for controlling an alternator driven by an engine, comprising:
   a field current control section which has a switch connected in series with a field coil of the alternator;
   a voltage detecting section which detects an output voltage of the alternator;
   a comparing section which compares the detected output voltage and an adjust voltage, and controls the field current control section in response to the comparison result so as to control the detected output voltage to the adjust voltage;

a rotation speed detecting section which detects rotation speed of the alternator; and a rotation speed responsive section which changes a value of the voltage compared in the comparing section in accordance with the detected rotation speed so as to reduce a rotation speed of an inflection point in accordance with a reduction of the detected rotation speed, in which driving torque of the alternator suddenly changes under a control of the comparing section.

18. The vehicle alternator control system in claim 17, wherein the rotation speed responsive section changes the voltage when the rotation speed is in a range that is defined with a lower limit and an upper limit and substantially corresponds to an idling range of the engine, and the rotation speed responsive section changes the voltage so that the rotation speed of the inflection point is positioned below the detected rotation speed while the rotation speed is in the range.

19. The vehicle alternator control system in claim 17, wherein the rotation speed responsive section changes the adjust voltage.

20. A vehicle alternator control system for controlling an alternator driven by an engine, comprising:

a field current control section which has a switch connected in series with a field coil of the alternator;

a voltage detecting section which detects an output voltage of the alternator;

a control section which controls the field current control section so as to control the detected output voltage to an adjust voltage, the control section providing a driving torque characteristic of the alternator with respect to the rotation speed, the driving torque characteristic having an inflection point in which the driving torque takes a peak value;

a rotation speed detecting section which detects rotation speed of the alternator; and an adjust voltage setting section which sets the adjust voltage in accordance with the detected rotation speed so as to keep the rotation speed of the inflection point below the detected rotation speed when the rotation speed is in an idling speed range.

* * * * *